Figure 1:
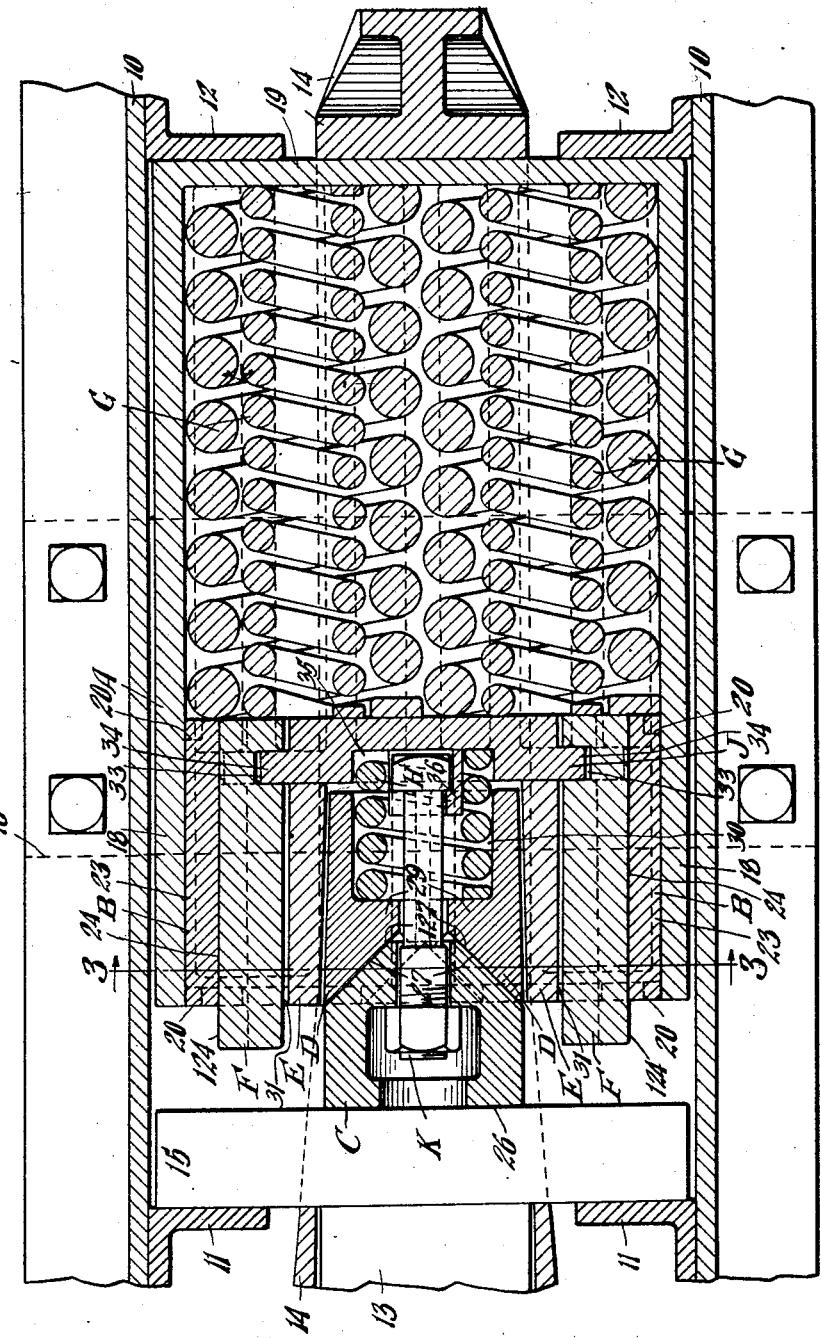

Nov. 22, 1927.

J. F. O'CONNOR 1,650,381

FRICTION SHOCK ABSORBING MECHANISM

Filed April 17, 1926    2 Sheets-Sheet 1

Witness
Wm. Geiger

Inventor
John F. O'Connor
By George I. Haight
His Atty.

Nov. 22, 1927. 1,650,381
J. F. O'CONNOR
FRICTION SHOCK ABSORBING MECHANISM
Filed April 17, 1926 2 Sheets-Sheet 2
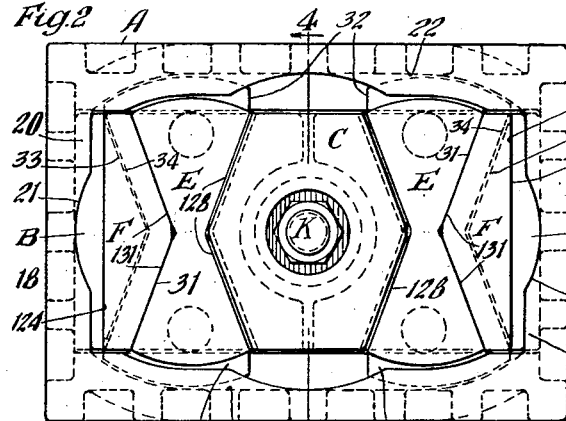
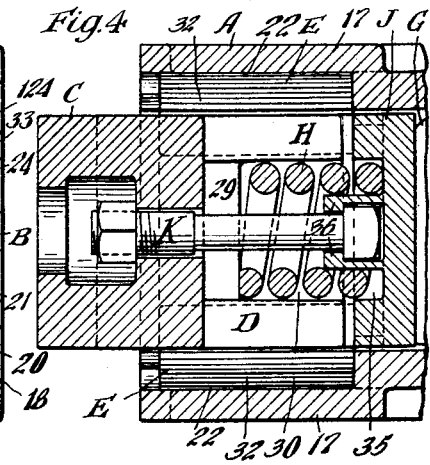
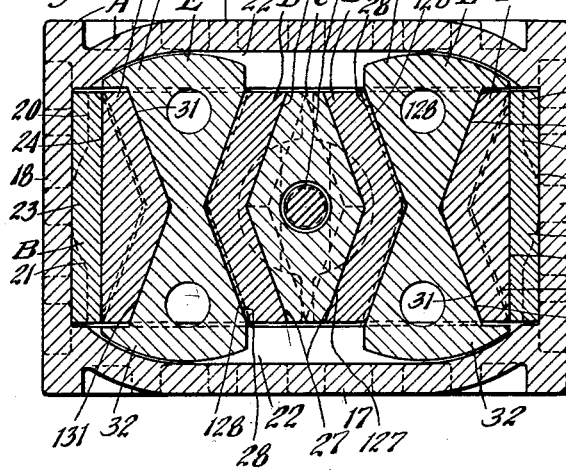
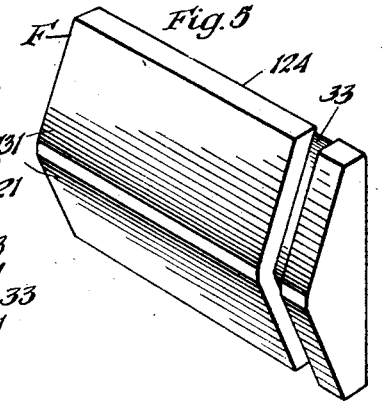
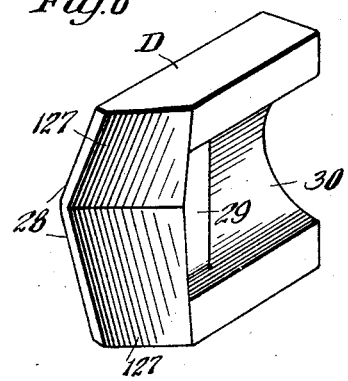
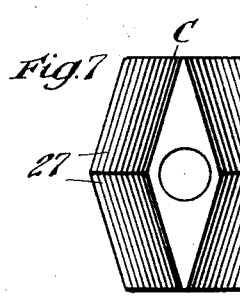
Inventor
John F. O'Connor
By George I. Haight
His Atty.
Witness
Wm. Geiger Patented Nov. 22, 1927.

1,650,381

UNITED STATES PATENT OFFICE.

JOHN F. O'CONNOR, OF CHICAGO, ILLINOIS, ASSIGNOR TO W. H. MINER, INC., OF CHICAGO, ILLINOIS, A CORPORATION OF DELAWARE.

FRICTION SHOCK-ABSORBING MECHANISM.

Application filed April 17, 1926. Serial No. 102,626.

This invention relates to improvements in friction shock absorbing mechanisms.

One object of the invention is to provide a friction shock absorbing mechanism of high capacity, especially adapted for railway draft rigging, including a plurality of relatively movable friction elements of rugged construction to provide a gear of exceptional strength.

Another object of the invention is to provide a friction shock absorbing mechanism, including a plurality of relatively movable friction elements, wherein the movable elements are directly actuated by means independent of the usual main follower, including a wedge element co-operating with a spring follower anchored to the movable friction elements, the anchorage between the follower and movable friction element being designed to provide maximum strength.

Still another object of the invention is to provide a friction shock absorbing mechanism of the character indicated, including a plurality of relatively movable friction elements in the form of relatively heavy plates or bars, wherein the friction elements are braced to prevent distortion of the same under the heavy forces acting during compression of the mechanism.

Other and further objects and advantages of this invention will more fully and clearly appear from the description and claims hereinafter following.

In the drawings, forming a part of this specification, Figure 1 is a longitudinal, horizontal, sectional view of a portion of a railway draft rigging, showing my improvements in connection therewith. Figure 2 is a front elevational view of the shock absorbing mechanism proper. Figure 3 is a transverse, vertical, sectional view corresponding substantially to the line 3—3 of Figure 1. Figure 4 is a longitudinal, vertical, sectional view of the front end of the shock absorbing mechanism proper, corresponding substantially to the line 4—4 of Figure 2. Figures 5 and 6 are detailed, perspective views respectively of one of the friction elements and a friction shoe employed in connection with my improved mechanism, and Figure 7 is a rear end, elevational view of a wedge member employed in my improved mechanism.

In said drawings, 10—10 indicate channel-shaped center or draft sills or a railway car underframe, to the inner faces of which are secured front stop lugs 11—11 and rear stop lugs 12—12. The inner end of the drawbar is designated by 13, to which is operatively connected a yoke 14 of well-known form. The shock absorbing mechanism proper and a front main follower 15 are disposed within the yoke, the yoke and the parts therewithin being supported in operative relation by a detachable saddle plate 16 fixed to the draft sills.

The improved shock absorbing mechanism proper, as shown, comprises broadly a casing A; a pair of liners B—B; a main wedge C; a pair of friction wedge shoes D—D; a pair of fixed friction elements E—E; a pair of longitudinally movable friction elements F—F; a main spring resistance G; an auxiliary spring resistance H; a spring follower J; and a retainer bolt K.

The casing A is of generally rectangular box-like form having horizontally disposed spaced top and bottom walls 17—17, longitudinally extending spaced vertical side walls 18—18, and a transverse vertical rear end wall 19. The end wall 19 co-operates with the rear stop lugs 12 in the manner of the usual rear follower. Adjacent the front end of the casing, each side wall 18 is provided with a pair of inwardly projecting flanges 20—20, one of the flanges of each pair coinciding with the front end of the casing and the other flange being spaced rearwardly thereof. The flanges 20 are centrally cut away as indicated at 21—21 to permit insertion of the spring resistance elements G. The top and bottom walls 17 of the casing are provided with pockets 22—22, each wall being provided with a single pocket extending across the same. The pockets 22 as shown are substantially concave in form and are adapted to receive extensions on the fixed friction elements E, serving as seats for the same, the front and rear end walls of the pockets 22 engaging the opposite ends of the extensions on the friction elements E to hold the same against longitudinal movement with reference to the casing A.

The liners B are in the form of heavy rectangular plate-like members and are disposed at opposite sides of the casing between the outer and inner flanges 20 on the side walls thereof. The liners are provided with lateral enlargements 23 on the outer sides thereof adapted to snugly fit between the front and rear flanges at the corresponding sides of the casing, thereby preventing longitudinal displacement of the liners. At the front and rear ends, the liners are cut away as most clearly shown in Figure 2, to present central convex enlargements adapted to fit within the concave cut away portions 21 of the flanges 20. On the inner side, each liner B is provided with a flat longitudinally extending friction surface 24 adapted to co-operate with the corresponding movable friction element F. The opposed friction surfaces 24 presented by the liners B, are preferably parallel to the longitudinal axis of the mechanism.

The wedge block C is in the form of a hollow casting having a front end face 26 adapted to bear on the inner face of the main follower 15. At the inner end, the block C has a pair of wedge faces 27—27 converging inwardly of the mechanism. As most clearly shown in Figures 1, 2, 3 and 7, the wedge faces 27 of the block C are of substantially V-form.

The friction shoes D, which are two in number, are disposed at opposite sides of the mechanism and co-operate with the wedge block C. The shoes D are of the same design, each having an outer longitudinally disposed friction surface 28 of substantially V-form adapted to co-operate with the corresponding friction element E. On the inner side, each shoe is provided with a lateral enlargement 29 at the forward end thereof having a front wedge face 127 of V-form, correspondingly inclined to the wedge face 27 at the same side of the wedge block C and co-operating therewith. At the inner end, the enlargement 29 of each shoe presents a transverse flat face adapted to co-operate with the front end of the auxiliary spring resistance H. Rearwardly of the enlargement 29, the friction shoe D is cut away as most clearly shown in Figures 1 and 6 to accommodate the coil forming the auxiliary spring resistance H, the cut away portion being in the form of a concave pocket 30.

The friction plates E, which are two in number, are disposed at opposite sides of the friction shoes D. The two plates E are of the same design and as most clearly shown in Figures 2 and 4, each plate is cut away at opposite sides to present re-entrant V-shaped longitudinally disposed friction surfaces. The friction surface on the inner side of each friction element E is designated by 128 and corresponds in contour with the friction surface 28 of the friction shoe D at the same side of the mechanism and is adapted to co-operate therewith. The outer friction surface of each friction element E is designated by 31 and is adapted to co-operate with a similar friction surface on the corresponding movable friction plate F. As most clearly shown in Figures 2 and 3, each friction element E is provided with enlargements 32—32 at the upper and lower sides thereof, the enlargements 32 having convex outer surfaces and fitting within the pockets 22 of the top and bottom walls 17 at the corresponding side of the casing A. The side portions of the enlargements 32 project laterally beyond the friction surfaces of the element E and overhang the friction shoe D and the movable friction plate F at the same side of the mechanism, as most clearly shown in Figures 2 and 3. The enlargements 32 have a certain amount of play laterally in the pockets 22 so that the fixed friction plates may be displaced laterally during compression of the mechanism and still be held positively against longitudinal movement with reference to the casing A.

The friction plates F, which are also two in number, are disposed at opposite sides of the mechanism and are interposed between the liners B and the friction plates E. The friction plates F are of identical design, and as most clearly shown in Figure 5, each plate is of substantially triangular cross-section. Each plate F is provided with an outer longitudinally disposed flat friction surface 124 adapted to co-operate with the corresponding flat friction surface 24 of the liner B at the same side of the mechanism. On the inner side, each friction element F presents a V-shaped friction surface 131 interfitting with the friction surface 31 of the fixed friction element E at the same side of the mechanism. Adjacent the rear end, each friction element F is provided on the inner side thereof with a groove 33 for a purpose hereinafter described.

The spring follower J comprises a main body portion in the form of a relatively heavy plate provided with lateral flanges 34 at the opposite side edges thereof, the flanges 34 being forwardly offset with reference to the main body portion of the follower and of V-form so as to fit the V-shaped recesses or grooves 33 of the movable friction elements F. The front face of the follower J is centrally recessed as indicated at 35, to provide a seat for the rear end of the spring resistance H. The spring follower J is also provided with a forwardly projecting central lug 36 recessed to receive the head of the retainer bolt K. The recess is open at one side as shown to permit lateral insertion of the head of the bolt and the front wall of the lug is slotted to accommodate the shank of the bolt.

The spring resistance elements G comprise two units in twin arrangement, each unit consisting of a relatively heavy outer coil and a lighter inner coil, the opposite ends of the coils bearing respectively on the transverse rear end wall 19 of the casing A and the rear face of the spring follower, and the inner end of the corresponding movable friction element F. The spring resistance G is placed under initial compresison when the parts are assembled and are in the position shown in Figure 1.

The auxiliary spring resistance H, which is in the form of a single coil, is interposed between the enlargements on the friction shoes D—D and the front side of the spring follower J, the inner end of the coil being seated in the opening 35 of the spring follower.

The retainer bolt K has the opposite ends thereof anchored to the spring follower J and the wedge block C, the head of the bolt being seated in the recess of the lug 36 as hereinbefore pointed out, and the nut of the bolt being accommodated within the hollow portion of the block C. The bolt K is so adjusted as to maintain the auxiliary spring H under an initial compression when the parts are in the full release position of the mechanism. In addition to holding the parts under compression, the bolt K serves to hold the same assembled.

In assembling the mechanism, the main springs are put in place and elements B—B put in position. Then the follower J with both elements F—F locked in place, are entered. Pressure is then applied to the outer ends of the elements F, compressing the springs slightly, and the elements E—E are entered at the center and moved outward into place, and pressure released. The retainer bolt K, spring H, shoes D—D and wedge C are applied in the order mentioned. Pressure is now applied to wedge C and the bolt K adjusted, to overall length. In this connection, it is pointed out that the top and bottom walls of the shell are centrally recessed to permit insertion of the elements E—E.

Figure 1 of the drawings shows the full release position of the parts of the mechanism. As shown in this figure, the friction plates E are engaged by a spring follower J, limiting the outward movement thereof and the friction shoes D—D are slightly spaced from the front face of the spring follower. In the normal, full release position of the parts, the front ends of the movable friction elements F are spaced from the inner face of the main follower 15 and this condition prevails throughout the operation of the mechanism, the movement of the plates F being effected through the medium of the wedge C, friction shoes D—D and the spring follower J.

The operation of my improved shock absorbing mechanism upon compression, is as follows: The front follower 15 and the wedge block C are moved inwardly relatively to the casing A. During the initial compression, the spring H will first be compressed until the inner ends of the friction shoes D come into engagement with the spring follower J, whereupon the spring follower will be moved with the friction shoes D and the main spring resistance elements G will be compressed. During the relative movement of the wedge C and the casing A, a wedging action will be set up between the wedge block and the friction shoes, forcing the shoes laterally against the friction elements E, bringing the latter into tight frictional engagement with the elements F, and forcing the latter against the friction surfaces of the liners B. During the inward movement of the wedge block C and wedge friction shoes D—D, the spring follower will be forced inwardly, carrying the friction elements F inwardly also. This action will continue either until the actuating force is reduced, or the main follower 15 comes into abutment with the outer end of the casing A, whereupon the pressure will be transmitted directly through the main follower and the casing to the stop lugs on the draft sills, these elements acting as a solid column load sustaining means to transmit the actuating force and relieve the main springs from excessive compression. When the actuating force is reduced, the main spring resistance G will return the parts to normal position. Outward movement of the spring follower J will be limited by engagement with the inner ends of the friction elements E which are held against longitudinal movement within the pockets 22 of the casing A. The expansive action of the spring H will return the friction shoes D and wedge block C to normal position, outward movement of these elements being limited by the retainer bolt J which is anchored to the spring follower and wedge block.

From the preceding description taken in connection with the drawings, it will be evident that I have provided a shock absorbing mechanism of high capacity, which is of sturdy and rugged design. The relatively movable friction elements are of exceptional strength, on account of the same being provided with enlarged sections. It will be evident that by providing the friction elements with V-shaped engaging surfaces, and making the outer movable friction elements of substantially triangular cross-section, all of these elements are greatly strengthened over friction elements of plate-like form, which are of the same thickness throughout. The fixed plates are also of unusual strength due to the upper and lower portions thereof, which engage within the pockets of the top and bottom walls of the casing, being enlarged laterally. The V-form construction of flanges on the spring follower engaging within correspondingly formed openings or grooves in the movable friction elements also imparts maximum strength to the connection between the spring follower and friction elements.

While I have herein shown and described what I now consider the preferred manner of carrying out my invention, the same is merely illustrative, and I contemplate all modifications and changes that come within the scope of the claims appended hereto.

I claim:

1. In a friction shock absorbing mechanism, the combination with a column member having longitudinally disposed friction surfaces; of movable friction elements co-operating with said member; additional friction elements held against movement with reference to the column member, said first named elements being laterally enlarged to provide strength against distortion, and said second named friction elements having friction surfaces inter-fitting with said laterally enlarged portions of said first named friction elements, the friction surfaces of said second named elements embracing and laterally overhanging said first named elements; friction shoes frictionally engaging said second named elements; lateral wedge pressure creating means co-operating with said shoes; and a spring resistance element opposing movement of said first named friction elements.

2. In a friction shock absorbing mechanism, the combination with a column member having longitudinally disposed flat friction surfaces; of friction elements held against movement longitudinally of said member; a plurality of friction elements relatively movable longitudinally of said member and engaging the friction surfaces thereof, said elements having friction surfaces of V-form co-operating with similar friction surfaces on said first-named elements; friction shoes frictionally engaging said first named elements; a main spring resistance opposing movement of said second named elements; and pressure transmitting and lateral wedge pressure creating means co-operating with said shoes.

3. In a friction shock absorbing mechanism, the combination with a column member; of a main follower, said follower and column member being relatively movable; a plurality of relatively movable friction elements, certain of which co-operate with the column member, said last named elements having abutment faces thereon; friction shoes co-operating with the remaining elements; a lateral wedge pressure creating means co-operating with the shoes, said lateral pressure creating means being movable with the main follower; a spring follower engaged by the friction shoes and movable inwardly of the mechanism with said shoes, said spring follower having flanges thereon co-operating with said abutment faces for anchoring the spring follower to the elements having the abutment faces, said anchoring flanges and abutment faces being of greater length than the height of the friction elements to provide relatively large engaging faces to prevent distortion of the spring follower; and a spring resistance opposing movement of the spring follower.

4. In a friction shock absorbing mechanism, the combination with a column member having longitudinally disposed friction surfaces; of longitudinally disposed friction elements co-operating with the friction surfaces of said member; a main spring resistance; a spring follower co-operating with the spring resistance, said spring follower having flanges of V-form engaging similarly parallel grooves in said friction elements for anchoring the elements to the spring follower; additional friction elements held against longitudinal movement during the compression stroke of the mechanism and co-operating with the movable plates; and a friction wedge system including a wedge member and friction shoes; said friction wedge system being engageable with the spring follower to effect movement of the latter and of the friction elements anchored thereto.

5. In a friction shock absorbing mechanism, the combination with a friction shell having interior longitudinally disposed, opposed friction surfaces; of a pair of friction elements co-operating with said shell friction surfaces, said friction elements having projecting V-shaped surfaces on the inner sides thereof; a pair of friction elements enlarged at the top and bottom to provide portions of dove tailed cross-section, said enlargements being seated in pockets in said shell to hold said last-named elements against longitudinal movement with reference to the shell, but permitting a certain amount of lateral displacement of said elements being provided with friction surfaces on the opposite sides of said enlargements, said last-named elements frictionally engaging said first-named elements and overhanging the V-shaped friction surfaces thereof; a main spring resistance and a co-operating spring follower; a friction wedge system including friction shoes co-operating with said friction elements, said wedge system engaging the spring follower during compression of the mechanism to effect movement of the same; and means on said spring follower engaging said first named friction elements to effect movement thereof with reference to the remaining friction elements.

In witness that I claim the foregoing I have hereunto subscribed my name this 13th day of April, 1926.

JOHN F. O'CONNOR